United States Patent
Polley et al.

(10) Patent No.: US 9,667,289 B2
(45) Date of Patent: May 30, 2017

(54) METHODS AND APPARATUS FOR REDUCING NOISE, POWER AND SETTLING TIME IN MULTI-MODAL ANALOG MULTIPLEXED DATA ACQUISITION SYSTEMS

(71) Applicant: Texas Instruments Incorporated, Dallas, TX (US)

(72) Inventors: Arup Polley, Richardson, TX (US); Ajit Sharma, Dallas, TX (US); Seung Bae Lee, Allen, TX (US); Sriram Narayanan, Richardson, TX (US); Srinath Ramaswamy, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/084,052

(22) Filed: Mar. 29, 2016

(65) Prior Publication Data

US 2016/0380660 A1    Dec. 29, 2016

Related U.S. Application Data

(60) Provisional application No. 62/184,575, filed on Jun. 25, 2015.

(51) Int. Cl.
*H04L 27/06* (2006.01)
*H04B 1/10* (2006.01)

(52) U.S. Cl.
CPC ... *H04B 1/1036* (2013.01); *H04B 2001/1054* (2013.01)

(58) Field of Classification Search
CPC ............... H04B 1/1036; H04B 2001/1054
See application file for complete search history.

(56) References Cited

U.S. PATENT DOCUMENTS

| | | | | |
|---|---|---|---|---|
| 4,677,422 A | * | 6/1987 | Naito | H03M 1/1215 341/122 |
| 8,320,408 B2 | * | 11/2012 | Tzeng | H04B 1/707 370/479 |
| 9,432,035 B2 | * | 8/2016 | Vyas | H03M 1/002 |
| 2004/0239545 A1 | * | 12/2004 | Tsai | H03M 1/0626 341/155 |

(Continued)

*Primary Examiner* — Dac Ha
(74) *Attorney, Agent, or Firm* — John R. Pessetto; Charles A. Brill; Frank D. Cimino (57) ABSTRACT

Reduced noise and power with rapid settling time and increased performance in multi-modal analog multiplexed data acquisition systems. An example apparatus arrangement includes a circuit input configured to receive a plurality of analog input signals; an analog to digital converter circuit configured to output a digital representation of an analog voltage; a selection circuit configured to select one of the analog input signals received at the circuit input; a buffer coupled to receive the selected one of the analog input signals; a filter coupled to the buffer and configured to perform a high bandwidth sample operation and a low bandwidth sample operation and having a filter output, responsive to a control signal; and a sampling capacitor coupled to the filter to sample the filter output, and having an output coupled to the analog to digital converter. Methods and additional apparatus arrangements are disclosed.

17 Claims, 4 Drawing Sheets

(56) References Cited

U.S. PATENT DOCUMENTS

| | | | |
|---|---|---|---|
| 2006/0082484 A1* | 4/2006 | Linder | H03M 1/007 |
| | | | 341/155 |
| 2011/0299630 A1* | 12/2011 | Petrovic | H04B 7/0408 |
| | | | 375/340 |
| 2014/0333373 A1* | 11/2014 | Pamarti | H03H 19/00 |
| | | | 327/553 |
| 2015/0018676 A1* | 1/2015 | Barak | A61B 5/02444 |
| | | | 600/430 |
| 2015/0178542 A1* | 6/2015 | Minteer | G06K 9/0002 |
| | | | 382/124 |

* cited by examiner

METHODS AND APPARATUS FOR REDUCING NOISE, POWER AND SETTLING TIME IN MULTI-MODAL ANALOG MULTIPLEXED DATA ACQUISITION SYSTEMS

RELATED APPLICATIONS

The present application claims the benefit of priority under 35 U.S.C. §119(e) to U.S. Provisional Application Ser. No. 62/184,575 filed Jun. 25, 2015, entitled "NOISE/POWER/SETTLING TIME REDUCTION IN MULTI-MODAL ANALOG MULTIPLEXED SYSTEMS," which application is hereby incorporated by reference herein in its entirety.

TECHNICAL FIELD

The present application relates in general to electronic circuitry, and in particular to methods and circuitry for reduced noise, increased efficiency, and increased sample rate in multi-modal analog multiplexed data acquisition systems.

BACKGROUND

Multi-modal analog multiplexed data acquisition systems are a category of data acquisition systems that employ at least one shared analog to digital converter (ADC) and additional circuit elements to sample the voltage levels of multiple individual analog signals with significantly dissimilar characteristics, and convert the sampled voltage levels to digital representations. In contrast to multi-modal systems, an analog multiplexed data acquisition system that is not multi-modal samples multiple analog signals with similar characteristics. In other systems, the analog to digital data conversion is done for each sensor, and no multiplexing is used.

Typically the several input analog signals of a multi-modal analog multiplexed data acquisition system have a variety of differing characteristics such as signal bandwidth, range of voltage levels, and noise content.

A multi-modal analog multiplexed system as well as other types of data acquisition systems may employ circuitry to adjust the voltage range of the input analog signals, filter high frequency components, and perform other signal conditioning and processing functions necessary to meet system requirements for a specific application. For simplicity of explanation, the term "input analog signal" refers both to an analog signal after modification as well as the signal itself for unmodified signals.

Typical multi-modal analog multiplexed systems couple multiple input analog signals to the inputs of an analog multiplexer. The single output of the analog multiplexer is coupled to the input of a sample and hold circuit. The output of the sample and hold circuit is coupled to the input of the ADC conversion circuitry. The sample and hold circuit is often internal to modern ADC integrated circuits.

An example of a multi-modal analog multiplexed system is a health and fitness product configured to assist a user in managing physical exercise routines by providing data sensed from their body during exercise. Such an example system could employ different types of analog sensors for measuring human body parameters such as pulse rate, galvanic skin response and heart electrical activity (similar to an electrocardiogram). Other applications would include systems with a variety of sensors, for example sensors could measure temperature, air or fluid pressure, humidity, luminance, proximity, received signal strength, and the like.

The function of the sample and hold circuit of a multi-modal analog multiplexed system is to briefly store the voltage level of the input analog signal that has been routed from one of the multiplexer inputs to the multiplexer output. The voltage level stored is approximately equal to or approximately proportional to the instantaneous voltage of the input analog signal at the point in time when the sample is taken.

In prior known approach systems, in a typical multi-modal analog multiplexed system, sampling the analog input signal and then performing analog to digital conversion are performed as two separate events. To accomplish this it is necessary to store the sampled input signal on a sampling capacitor, and then to consequently to introduce a buffer to transfer the stored voltage from the sampling capacitor to a second capacitor within the analog to digital converter (ADC). A buffer between the sampling capacitor is used and has the responsibility for quickly charging the second capacitor within the ADC (which requires high bandwidth) and without adding excess noise to the sampled signal (which require low noise) and at low power consumption.

The parameters and requirements on the prior known approach systems lead to design trade-offs. The conventional design trade-offs are first, using a low bandwidth, high noise power spectral density amplifier, which can be designed to operate at low power. The total noise (Noise power spectral density multiplied by bandwidth) can be low, but only if the bandwidth is low too. So the noise power spectral density is high, and bandwidth is low. Second, the use of a high bandwidth, high noise power spectral density amplifier can be considered, which can be designed to operate at a moderate power. Third, the use of a high bandwidth, very low noise spectral power density amplifier can be considered, which meets the requirements for bandwidth and low noise but cannot be designed for low power.

Many ADC systems employ a balanced circuit path for differential analog signals. For simplicity of explanation a single-ended (not balanced) system will be described herein; however, the descriptions herein of both prior approaches and the arrangements of the present application are applicable to circuits with balanced topologies as well as single-ended topologies.

A commonly employed prior known approach single-ended sample and hold circuit couples the output of the analog multiplexer to the input of a buffer (an amplifier to provide current drive typically with a gain of 1). The buffer output is coupled to the input of a low loss switch such as a field effect transistor (FET). The output of the switch is coupled to both the input of the ADC conversion circuitry and one terminal of a capacitor (referenced herein as the sampling capacitor). The other terminal of the sampling capacitor is typically connected to a known reference potential, such as ground of the ADC reference voltage circuit. In the case of some prior approaches the above buffer may not be described as part of the sample and hold circuit. (As stated above the ADC may contain the switch and sampling capacitor.) Sample and hold circuits can potentially be more complex than the single switch and single capacitor described above. The descriptions herein of sample and hold circuits for prior approaches and the present application are based on a single switch and single capacitor as described above, but the concepts presented herein are applicable to more complex sample and hold circuit topologies that are functionally equivalent to the above described sample and hold circuit with a single switch and single capacitor.

Figure 1:
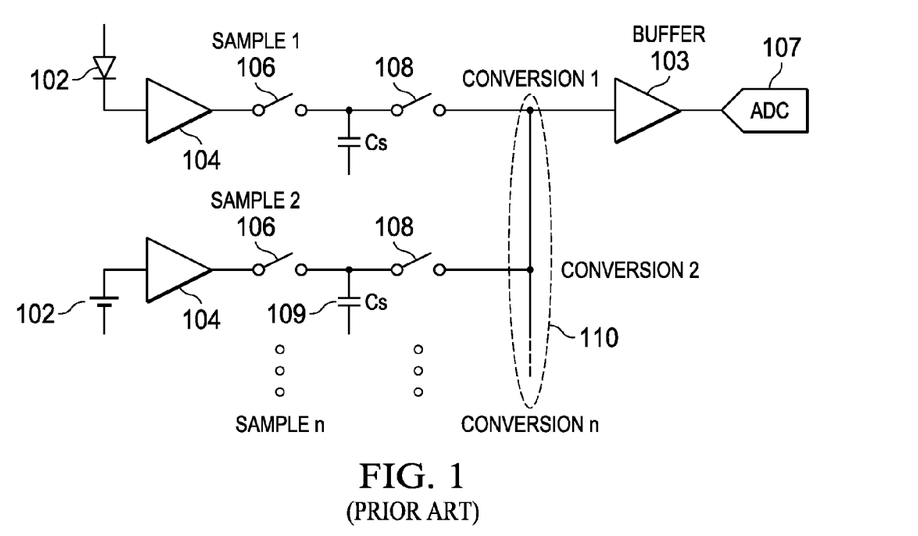
FIG. 1 depicts in a block diagram a typical known prior approach multi-modal converter circuit arrangement.

FIG. 1 depicts, for example, a prior known approach for a multi-modal analog multiplexed system 100. In FIG. 1, a plurality of sensors 102 such as photodiodes, capacitive sensors, thermocouples, and the like are shown. A plurality of n buffers 1014 are shown coupled to n sampling capacitors 109 using n sampling switches 106 to form the samples across the sampling capacitors Cs. A shared output buffer 103 is shown coupled by n output switches 108 to the sampling capacitors Cs. The output buffer and the output switches and the node 110 form a multiplexer to route a single sample to the analog to digital converter ADC 107.

The operation of the example sample and hold circuit arrangement 100 to acquire a sample of the approximate instantaneous input analog signal voltage begins with the particular switch 106, corresponding to a selected input signal, transitioning from a blocking state (off) to a low loss conducting state (turning on). Turning on the switch 106 couples the selected buffer 104 output to the selected sampling capacitor Cs 109, and to the ADC conversion circuit input (the ADC conversion circuit is inactive at this time). The capacitor Cs charges (or discharges) in series with the buffer 104 output impedance, with the voltage across the sampling capacitor Cs approaching the voltage of the input analog signal. For simplicity of explanation, the descriptions herein of the sample and hold circuit including the buffer are based on an ideal RC (resistive-capacitive) circuit and ideal switch; however, non-ideal circuits can be made to operate similarly. After a pre-defined sampling time the switch 106 turned off. The sampling switch 108 then turns on coupling the capacitor to the buffer 103, and the ADC 107 then begins the process of converting the voltage across the sampling capacitor to a digital representation. This process is continued for each of the analog input signals.

A key characteristic of the sample and hold circuit such as shown in arrangement 100 is the bandwidth, which is related to the time required for the sampling capacitor to charge to a pre-defined fraction of a step voltage input when the switch 106 described above turns on. For an ideal circuit response to a step voltage input, the voltage across the capacitor reaches $1-e^{-t/RC}$, where t is the amount of time in seconds after the step input is applied across the resistance, R and the capacitance, C. R is the resistance in ohms in series with the sampling capacitor, and C is the capacitance in farads of the sampling capacitor. For the case of the sample and hold circuit, the resistance R is the output impedance of the buffer summed with intrinsic resistance of the circuit including resistance of interconnect conductors and internal resistance of the capacitor.

The product of R and C is known as the time constant (referred to as "tau" or "$\tau$"). The charge across the capacitor of an ideal circuit of a resistor and capacitor in series reaches approximately 63.2% of the step input voltage after one time constant (obtained by evaluating the expression $1-e^{-t/\tau}$ with $\tau=t$).

For a given prior known approach sample and hold circuit, a performance requirement typically exists for the voltage across the sampling capacitor to reach a pre-defined fraction of the instantaneous input analog signal voltage during the period of time the sample and hold switch is turned on, as described above. For example, for a case where the pre-defined fraction is 0.9999, the equation $0.9999=1-e^{-t/\tau}$ can be solved for the minimum number of time constants comprised by the sampling period (the time that the sample and hold switch is turned on). In a typical example, the minimum number of time constants can be approximately 9.2. The pre-defined fraction of the instantaneous input voltage is typically based on the number of digital bits of resolution produced by the ADC.

The settling time parameter of the sample and hold circuit is the time required for the voltage across the sampling capacitor to reach the predefined fraction of a step input voltage. Prior approach circuits are typically arranged and operated such that the sampling period and the settling time are approximately equivalent.

The bandwidth of the sample and hold circuit is inversely proportional to the time constant $\tau$. The above described sample and hold circuit forms an RC low pass filter where the sampling capacitor is in series with the buffer output impedance and the previously described intrinsic resistances of other circuit elements. The bandwidth of an ideal RC low pass filter is often defined as the frequency at which the square of the output voltage of the filter (the voltage across the capacitor) is equivalent to one-half the square of the input voltage of the filter for a single frequency sine-wave input. Based on the above definition the bandwidth of an ideal RC low pass filter is $1/2\pi\tau$ (in Hz.)

Various ADC technologies exist. The selection of a specific ADC technology for a given multi-modal analog multiplexed system is typically based on a number of factors including, for example, circuit cost, size, power consumption, resolution, and the number of conversions per second that can be achieved. The descriptions of prior approach and present application multi-modal analog multiplexed systems herein are applicable to systems employing ADC technologies that require a sample and hold circuit employing capacitance for voltage sampling and storage whether the sample and hold circuit is internal to the ADC, or the sampling capacitor can be implemented external to the ADC.

The number of samples per second that can be converted to digital representation by prior approach multi-modal analog multiplexed systems is typically based primarily on the sum of sampling period (of the sample and hold circuit) and the conversion time of the ADC. The reciprocal of the sum of the sampling period, the ADC conversion time, and other delays in the system is the maximum sample rate in samples per second that can be achieved by prior approaches.

Therefore, for prior known approach multi-modal analog multiplexed systems, an interdependence exists among the key characteristics of bandwidth of the sample and hold circuit, including the sample rate of the system, noise contribution to the sampled voltage level, and power consumption.

Multiplexing of the input analog signals is typically performed such that each input analog signal is selected one signal at a time by the multiplexer in a pre-defined sequence and for a pre-defined period of time that is approximately the same period of time that each of the other input analog signals are selected. The multiplexer is typically controlled such that the selection of input analog signals in a pre-defined sequence repeats cyclically while the system is operating. When an input analog signal is selected by the multiplexer, the selected signal is routed through the multiplexer to the multiplexer output and all other input analog signals are blocked. The digital information can then be used for further computation, for display, for transmission to another system or computer, and the like.

High bandwidth (compared to low bandwidth) for the sample and hold circuit typically results in higher sample rates being possible, but also in increased noise contribution to the sampled voltage. A high sample rate compared to a low sample rate could result in the system having the capability to be made with a larger number of input analog input signals.

In contrast, a sample and hold circuit made with low bandwidth typically results in lower sample rate, but also having a reduced noise contribution to sampled voltage. However, a low sample rate may not allow system requirements of the number of input analog input signals to be met.

Improvements are thus desirable in the performance and efficiency of multi-modal analog multiplexed systems. Improvements that result in both higher sample rates and reduction of noise contribution to the sampled voltage, without significant increases in power consumption or circuit complexity, are of particular importance.

SUMMARY

In various aspects of the present application, a novel multi-modal multiplexed analog data acquisition system incorporates a filter coupled to a sampling capacitor that operates in a high bandwidth sampling operation for a portion of a sampling time, and subsequently operates in a low bandwidth sampling operation for another portion of the sampling time. The use of the novel arrangements of the present application enables a high bandwidth data acquisition system with rapid settling time and low noise transfer to the digital representation that provide performance not possible using prior known approaches In an example arrangement, an apparatus includes a circuit input configured to receive a plurality of analog input signals; an analog to digital converter circuit configured to output a digital representation of an analog voltage; a selection circuit configured to select one of the analog input signals received at the circuit input; a buffer coupled to receive the selected one of the analog input signals; a filter coupled to the buffer and configured to perform a high bandwidth sample operation and a low bandwidth sample operation and having a filter output, responsive to a control signal; and a sampling capacitor coupled to the filter to sample the filter output, and having an output coupled to the analog to digital converter.

In a further arrangement, in the apparatus above, the filter further includes a resistor selectively coupled in series with the sampling capacitor during the low bandwidth sample operation, responsive to control signals. In still another arrangement, in the above described apparatus, the filter further includes a short circuit path selectively coupled across the resistor during the high bandwidth operation, responsive to control signals.

In a still a further arrangement, in the above described arrangements, the filter further includes a first switch coupled to enable the short circuit path across the resistor, and a second switch coupled to enable to couple the resistor in series with the sampling capacitor. In still a another alternative arrangement, in the above described arrangements, the apparatus further includes a controller circuit coupled to control the selection circuit, the analog to digital converter, and to control the first switch and the second switch, configured to operate the filter in a high bandwidth mode and a low bandwidth mode during a sampling of an analog input signal onto the capacitor.

In yet another alternative arrangement, in the above described arrangements, the analog input signals include a biometric sensor signal. In still a further alternative arrangement, in the above described arrangements, the analog input signals have different signal bandwidth. In still another alternative arrangement, in the above described arrangement, at least one of the analog input signals corresponds to a sensor configured for determining a human pulse rate. In yet another arrangement, in the above described arrangements, the analog to digital converter is implemented using a successive approximation registered analog to digital converter.

In an example method arrangement, a method includes selecting an analog signal from a plurality of analog signals for conversion in an analog to digital converter; configuring a filter for a high bandwidth sampling operation; sampling the analog signal onto a sampling capacitor using the filter in the high bandwidth sampling operation for a first sampling time; configuring the filter for a low bandwidth sampling operation; sampling the analog signal onto the sampling capacitor using the filter in the low bandwidth sampling operation for a second sampling time; isolating the sampling capacitor from the analog signal; and using the analog to digital converter, converting the analog signal sampled by the capacitor to a digital representation.

In a further method arrangement, the above described method further includes during the high bandwidth sampling operation of the filter, providing a resistor coupled between the analog signal and the sampling capacitor; and during the low bandwidth sampling operation of the filter, providing a short circuit path across the resistor while coupling the sampling capacitor to the filter.

In still another alternative arrangement, the above described methods further include: during the low bandwidth sampling operation of the filter, removing the short circuit path across the resistor while coupling the sampling capacitor to the filter. In yet another arrangement, in the above described methods, the methods further include: wherein the first sampling time continues for a time period exceeding a predetermined multiple of a high bandwidth time constant. In still a further arrangement, in the above described methods, the second sampling time continues for a time period exceeding a predetermined multiple of a low bandwidth time constant. In another arrangement, in the above described methods, the methods further include coupling a buffer between the analog signal and the filter. In still another arrangement, in the above described methods, the methods include wherein at least one of the analog signals is from a biometric sensor.

In another example arrangement, an integrated circuit includes an analog to digital converter having an output for transmitting a digital representation of an analog signal; a sampling capacitor selectively coupled to an analog input signal, and having an output coupled to the analog to digital converter; and a filter selectively coupled between the analog input signal and the sampling capacitor having a high bandwidth operation and a low bandwidth operation, responsive to a control signal.

In still a further example arrangement, the above described integrated circuit further includes a multiplexer coupled to receive a plurality of analog input signals and outputting the analog input signal to the filter, responsive to a select control signal.

In yet another example arrangement, in the above described integrated circuits, the integrated circuit further includes a controller outputting control signals to the filter to select the high bandwidth operation and the low bandwidth operation.

In still another alternative arrangement, in the above described integrated circuit, the filter further comprises a resistor selectively coupled in series between the analog input signal and the sampling capacitor in the low bandwidth operation, and a short circuit path selectively coupled across the resistor in the high bandwidth operation.

Use of the novel arrangements provides a multi-modal analog multiplexed data acquisition system having a high bandwidth, short settling time, and reduced noise in the sampled signals when compared to prior approaches.

BRIEF DESCRIPTION OF THE DRAWINGS

For a more complete understanding of the illustrative examples of aspects of the present application that are described herein and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the illustrative example arrangements and are not necessarily drawn to scale.

DETAILED DESCRIPTION

The making and using of example illustrative arrangements that form aspects of the present application are discussed in detail below. It should be appreciated, however, that aspects of the present application provide many applicable inventive concepts that can be embodied in a wide variety of specific contexts. The specific arrangements discussed are merely illustrative of specific ways to make and use the various aspects of the present application, and the examples described do not limit the scope of the specification, or the scope of the appended claims.

For example, when the term "coupled" is used herein to describe the relationships between elements, the term as used in the specification and the appended claims is to be interpreted broadly, and is not to be limited to "connected" or "directly connected" but instead the term "coupled" may include connections made with intervening elements, and additional connections may be used between any elements that are "coupled".

Multiple comparisons of the arrangements of the present application and prior approaches are provided below. In all cases, these comparisons are based on operating conditions, input signal characteristics, and system performance requirements being approximately identical for both the present application and prior approaches. Further, the comparisons are based on approximately equivalent circuit operations of the arrangements of the present application and prior approaches, except where the novel aspects of the present application result in an aspect of the arrangement or circuit operation to differ as described below. The comparisons below of the various arrangements of the present application and prior approaches are not limited to a specific circuit, operating condition, or input signal characteristic.

Novel aspects of the arrangements of the present application can be incorporated into multi-modal analog multiplexed data acquisition circuits and can be made to achieve increased sample rate, reduced noise, and reduced power consumption. A novel aspect of the arrangements of the present application is the method and circuit arrangement to transition the bandwidth of the signal path through the sample and hold circuit from high bandwidth at the beginning of the sampling period to lower bandwidth prior to the end of the sampling period. In sharp contrast, in prior known approach multi-modal analog multiplexed data acquisition circuits, the bandwidth of the signal path through the sample and hold circuit is fixed and is not modified during sampling operation of the circuit.

Figure 2:
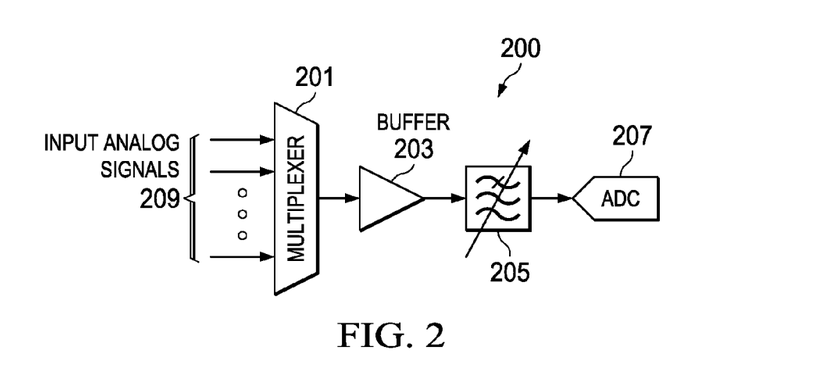
FIG. 2 depicts in a block diagram one possible arrangement of the novel sample and hold circuitry of an arrangement of the present application.

FIG. 2 illustrates in a block diagram 200 one possible arrangement of an example novel sample and hold circuit of the present application. One of the input analog signals 209 to be sampled and converted to a digital representation is selected by the analog multiplexer 201 and routed through the multiplexer to the input of the buffer (203). Approximately simultaneously, the ADC 207, operated under external control, begins the sample and hold function. The selected input analog signal passes through the buffer (203) to the input of the low pass filter (205). The low pass filter (205) is made such that under external control either high bandwidth or low bandwidth operation can be selected. At the beginning of the sample and hold operation, the filter 205 is placed in the high bandwidth state, to allow the approximate step voltage change applied to the filter input due to the multiplexer operation and switching internal to the filter to rapidly ramp to near the final level at the filter output. The sample and hold circuit is made and operated such that the final output of the filter (205) approximately reaches the pre-defined fraction (previously described) of the instantaneous voltage level input analog signal selected by the multiplexer (201). After a pre-defined time period, the filter (205) is transitioned to low bandwidth filter, resulting in high frequency noise being averaged to reduce the contribution of the noise to the sampled voltage, and therefore, to the digital representation generated by the ADC 207. After a second pre-defined period of time with the filter in the low bandwidth state, the ADC 207 transitions from the sampling portion of the sample and hold function to the hold portion of the sample and hold function, and approximately simultaneously begins the function of converting the analog voltage stored on the sampling capacitor (not shown, but positioned internal to the filter 205 or inside ADC 207) to a digital representation. After completion of the conversion to a digital representation, the above process can repeat with the selection of a different input analog signal by the multiplexer. In this manner multiple different input signals such as analog sensor inputs can be converted to digital representations using the single ADC circuit 207.

As previously described, a multi-modal analog multiplexed system may be made such that the input analog signals are adjusted and modified prior to voltage sampling. For simplicity of explanation "input analog signal" refers to the output of any circuit modifying an analog signal, as well as to the analog signal itself in cases where it is not modified.

Figure 3:
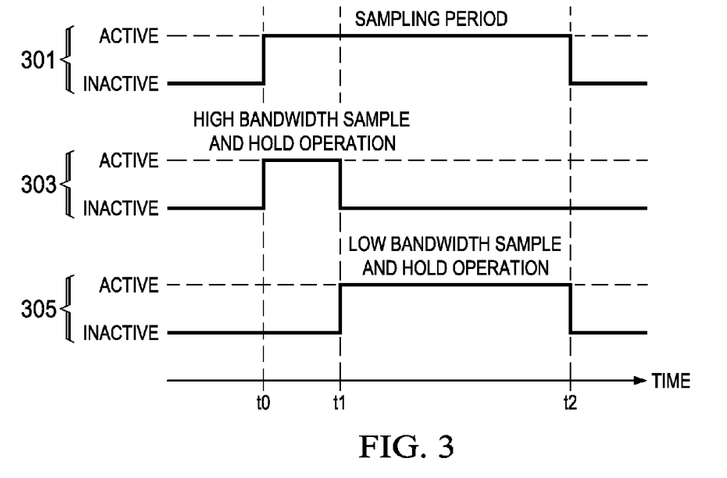
FIG. 3 depicts in a group of timing diagrams, the sequence of transition between high and low bandwidth within the sampling period of the sample and hold circuit of an arrangement of the present application.

FIG. 3 illustrates in a group of timing diagrams an example sequence of transitions between high and low bandwidth within the sampling period of the sample and hold circuit described above for the above referenced filter (element 205 of FIG. 2, circuit 200).

In FIG. 3, the sampling period (graph 301), the period of time that the filter (205 of FIG. 2, circuit 200) operates with high bandwidth (graph 303) during an initial portion of the sampling period, and the period of time that the filter (205 of FIG. 2, circuit 200) operates with low bandwidth (graph 305) immediately following high bandwidth operation until the end of the sampling period are shown. The "sampling period" as used herein refers to the period of time that the sample function of the sample and hold circuit is operating. FIG. 3 shows the sequence of transitions, consequently, there is no absolute time scale provided in FIG. 3, and the relative lengths of high and low bandwidth operation are not necessarily proportional to actual times that occur in example arrangements of the present application. The dotted lines perpendicular to the time axis (labeled t0, t1, and t2) coincide with transitions illustrated by the graphs (301, 303, and 305) that occur simultaneously or approximately simultaneously. Finally, for each timing diagram (301, 303, and 305) the active and inactive states are annotated; however, the vertical axis of FIG. 3 does not represent an electrical parameter and therefore does not have a scale.

Modern ADC circuits are often made with internal sample and hold circuits (as previously stated) that employ a capacitor (referenced herein as the "sampling capacitor") to store the approximate instantaneous voltage of an input analog signal. The sampling capacitor is often made with multiple capacitors in combination. For simplicity of explanation, the combined capacitance of a sample and hold circuit will be referenced herein as the "sampling capacitor." One or more switching elements are typically employed within the sample and hold circuits to couple the sampling capacitor (or capacitors) between the input analog signal terminal of the ADC and ground (or another voltage reference) when the sample and hold function begins operation. When the sampling operation is complete the above switching elements isolate the sampling capacitor from the input analog signal resulting in the capacitor storing (holding) the approximate instantaneous voltage level of the input analog signal on the sampling capacitor at the time the sampling function of the sample and hold circuit is complete. The remainder of the ADC circuit then begins the function of converting the voltage stored by the sampling capacitor to a digital representation. In one approach, a successive approximation registered ADC (SAR ADC) can be used, for example, to implement the ADC 207.

The low pass filter 205 of circuit 200 in FIG. 2 is described herein as employing the sampling capacitor (which can be external to or internal to the ADC) as part of the low pass filter function and employing switching elements of the sample and hold circuit described above as part of the function of configuring the filter for low and high bandwidth operation, as described above. The filter 205 of circuit 200, however, is depicted as being separate from the ADC (207 of circuit 200 in FIG. 2) for simplicity of explanation. Novel aspects of the present application, however, are not limited to use with ADC circuits employing internal sample and hold circuits. Novel aspects of the present application can be employed by multi-modal multiplexing ADC data acquisition systems where the sample and hold circuits are partially or fully external to the ADC. For example the sample and hold circuit can be interior to the filter 205 or provided as a separate function.

As previously stated the descriptions herein of the present application and prior approaches are based on a so-called single-ended signal path through various circuit elements. Many data acquisition systems employ a balanced signal path and differential analog signals. The use of differential signals can help to reject common mode noise and improve performance for input analog signals with a small peak to peak voltage range. Novel aspects of the present application are applicable to both single-ended and balanced signal paths. Descriptions herein are based on the single-ended signal paths for simplicity of explanation, however, alternative circuit topologies can be arranged that use differential signal paths, and these alternatives are also contemplated by the inventors and fall within the scope of the appended claims, and these alternative arrangements form additional aspects of the present application.

Figure 4:
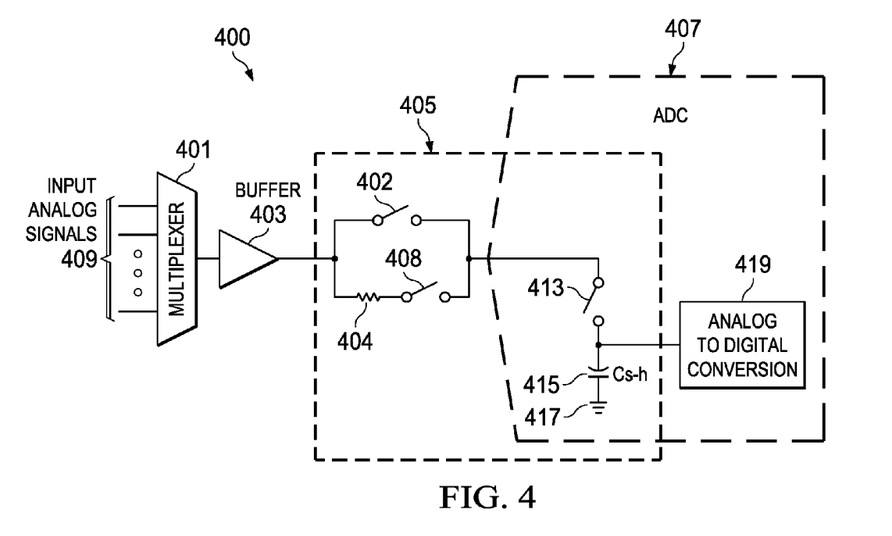
FIG. 4 depicts in a simplified circuit diagram, elements of a novel multi-modal analog multiplexed data acquisition arrangement incorporating aspects of the present application.

FIG. 4 illustrates in a simplified circuit diagram 400 elements of an example arrangement of a multi-modal analog multiplexed data acquisition system for further description of the novel aspects of the present application. FIG. 4 circuit 400 is similar to FIG. 2 circuit 200 in that the multiplexer, buffer, and ADC (401, 403, and 407 respectively) of 400 correspond to 201, 203, and 207 respectively of 200. The filter 205 of 200 is illustrated with more detail in FIG. 4 (compared to FIG. 2) comprising switch 402, resistor 404, switch 408, including in this example switch 413, capacitor Cs-h 415, and ground connection 417 shown interior to ADC 407, in this non-limiting example.

Prior to the multiplexer 401 selecting a different input analog signal (from the group of input analog signals 409), in the initial state of the system, switches 402, 408, and 413 are all turned off. The analog multiplexer 401 is then used to select one of several input signals 409, applying the selected signal to the input of the buffer 403. The buffer 403 typically provides a voltage gain of one (1), e.g. "unity gain", at its output. Approximately simultaneously with the multiplexer 401 selecting a new input analog signal (and deselecting the previously selected analog signal), the switches 402, 408, and 413 are all turned on. With switches 402 and 408 both turned on, a short circuit exists across the resistor 408. With switch 413 turned on and the resistor 404 shorted, the capacitor 415 charges (or discharges) through the output impedance of the buffer. As explained below, after a pre-defined number of time constants (a multiple of τH), switch 402 is turned off.

Once switch 402 is turned off (the path is open) the short circuit across the resistor 404 is removed, coupling the resistor 404 in series with the buffer output 403 and the capacitor 415. Due to the resistor 404 being coupled in series with the capacitor 415 when switch 402 is turned off, the time constant that characterizes the charge (or discharge) rate of the capacitor changes and increases to τL. As described below, the switches remain in the configuration with 408 and 413 turned on and 402 turned off, for a pre-defined number of time constants τL, at which time switches 408 and 413 are turned off. The voltage across the capacitor 315 when switches 408 and 413 are turned off remains approximately constant. At this point in the circuit operation, the analog to digital conversion circuitry 419 can convert the sampled voltage level across capacitor 415 to a digital representation.

While FIGS. 2 and 4 illustrate a filter that can be set for high or low bandwidth, novel aspects of the present application are not limited to employment of a filter. Example arrangements of the present application can be made with other techniques of switching between high and low bandwidth during the sampling period, such as the employment of a buffer with selectable high and low bandwidth modes. Other alternative arrangements that change the operation from a high bandwidth to a low bandwidth operation during the sampling time are also possible and form additional aspects of the present application, which also are contemplated by the inventors and which fall within the scope of the appended claims.

Figure 5:
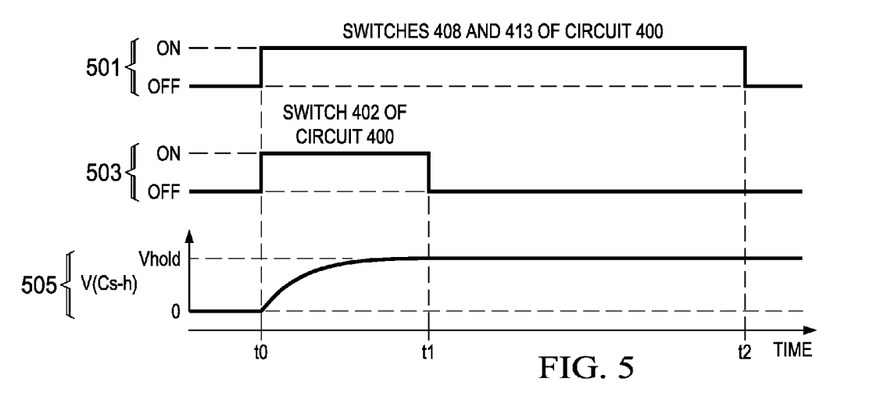
FIG. 5 depicts in a timing graph voltages in the arrangement of FIG. 4 during the sampling period.

FIG. 5 illustrates in a timing diagram the voltage across the capacitor 415 of circuit 400 in FIG. 4 from the time (t0) that switches 402, 408, and 413 of circuit 400 are all turned on as described above until the time (t2) at which the ADC begins the function of converting the voltage across capacitor 415 of circuit 30 to a digital representation. Timing diagram 501 illustrates the time that switches 402, 408, and 413 are turned on from time t0 through time t1. Timing diagram 503 illustrates the time that switch 402 is turned off and switches 408 and 413 remain on from time t1 through time t2. Graph 505 illustrates the voltage across capacitor 415 of circuit 400. At time t0 when switches 402, 408, and 413 are all turned on there is an approximate step voltage applied to the series combination of the output impedance of the buffer 403 and the capacitor 415 of circuit 400. The voltage ramp up illustrated in graph 505 from time t0 through time t1 is drawn to approximate the voltage across the capacitor of an ideal RC (resistance and capacitance in series) circuit with an ideal step function input across the RC circuit for a period of 11 RC time constants. Eleven (11) RC time constants is illustrated in graph 505 for the purpose of an example. Arrangements of the present application can be made such that the number of RC time constants from time t0 to time t1 is selected to achieve the fraction of the instantaneous voltage of the input analog signal needed to meet system sampling and conversion precision requirements. The voltage level labeled Vhold in graph 505 represents the voltage across the sampling capacitor after 11 RC time constants. During the time starting at t0 and ending at t1, R is the output impedance of the buffer 403 summed with the intrinsic resistance of series circuit elements as previously described and C is the capacitance of sampling capacitor 415 of circuit 400. Beginning at time t0 through time t1 the sample and hold circuit is configured by the switch states described above for high bandwidth and a corresponding shorter time constant, $\tau H$ ("H" indicates high bandwidth). At time t1, as illustrated in timing diagram 503, switch 402 of circuit 400 is turned off to include the resistor 404 in series with the buffer output, intrinsic circuit resistance, and the capacitor 415 as previously described resulting in an RC circuit with lower bandwidth and a longer time constant, $\tau L$ ("L" indicates low bandwidth). The RC circuit that is formed at time t1, having a larger time constant will average any high frequency noise, resulting in the voltage across capacitor 415 at time t2 typically being more representative of the signal voltage without noise than at time t1.

For many uses of the novel aspects of the present application the most effective noise reduction for a given sampling period will occur when $\tau L$ is selected such that approximately one (1) $\tau L$ time constant elapses during the time interval starting at time t1 and ending at time t2 of FIG. 5.

Prior known approach sample and hold circuits employed in prior known multi-modal analog multiplexed data acquisition systems are made with a fixed RC time constant. The fixed RC time constant of prior approaches is typically selected either for rapid settling of the sampling capacitor voltage resulting in a short sampling period, or for a long settling time to reduce sampled noise levels resulting in a long sampling period.

In sharp contrast to the prior approaches, the novel aspects of the present application results in rapid settling during the time period t0 to t1 illustrated in FIG. 5 and the high frequency noise reduction resulting from a long RC time constant during the time period t1 to t2 illustrated in FIG. 5. Consequently, the novel aspects of the present application result in example arrangements of the present application being made with high sample rates and significantly reduced noise levels being sampled. Further, when compared to the approaches of the prior known approach systems, use of the arrangements of the prior applications can reduce power consumption due to modifications of the amplifier bandwidth to achieve overall lower noise.

Figure 6:
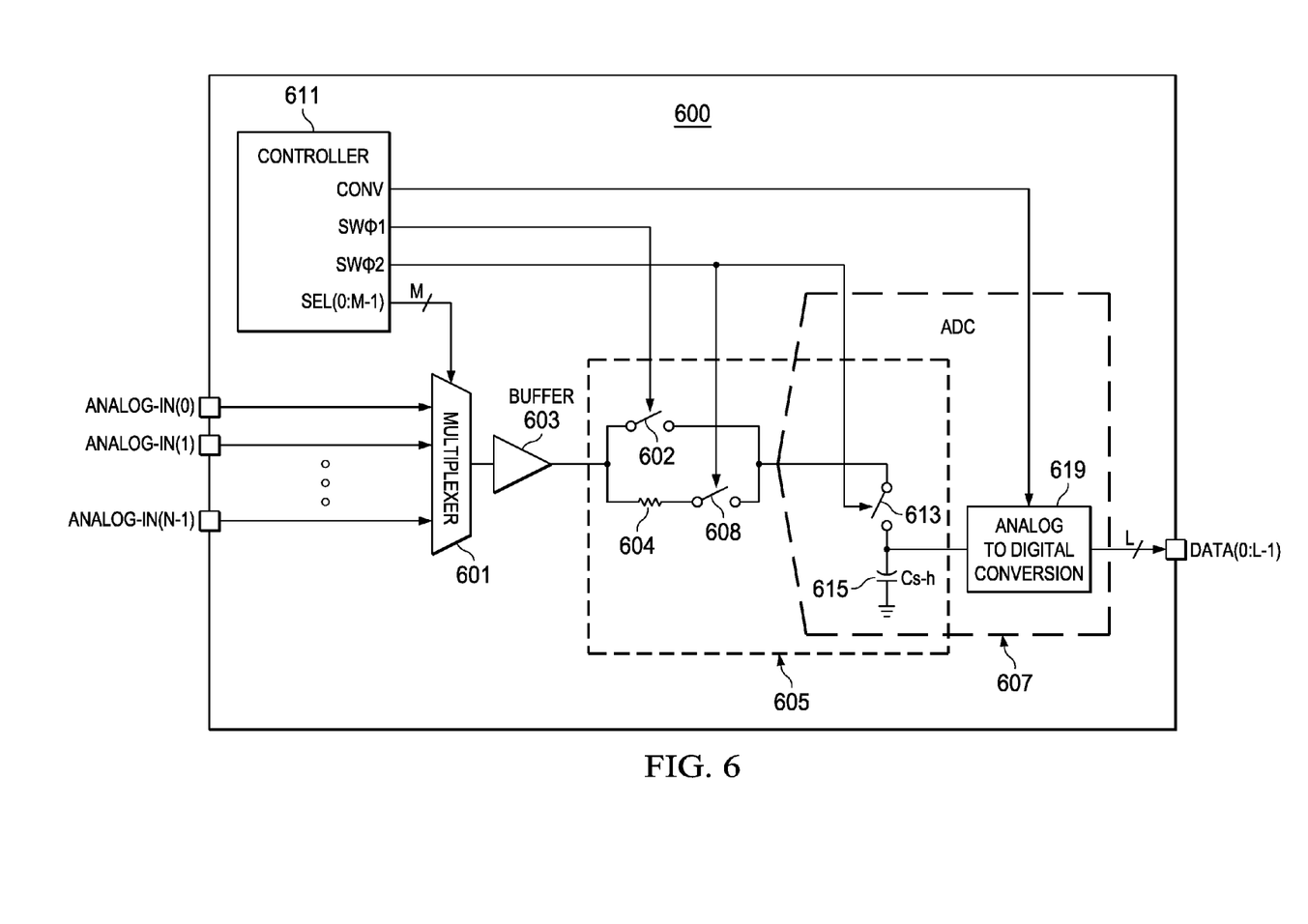
FIG. 6 depicts in a block diagram an integrated circuit of an example multi-modal analog multiplexed data acquisition arrangement of the present application.

FIG. 6 depicts in a block diagram an integrated circuit 500 of a typical multi-modal analog multiplexed data acquisition system incorporating arrangements of the present application. Common elements from FIG. 4, above, are numbered similarly except that the most significant digit is increased to "6" instead of "4", for ease of understanding. In the integrated circuit 600, the multi-modal analog multiplexed system of FIG. 4 is again shown with multiple (the quantity N) input analog signals labeled ANALOG-IN (0: N−1), the input selection multiplexer 601, the buffer 603, the switches 602, 608, and 613, and resistor 604 of the selectable bandwidth filter, 605 the sampling capacitor Cs-h numbered 615, and the ADC 607 including the conversion circuitry 619. The data outputs of the ADC 607 are labeled DATA (0-L−1).

In addition, FIG. 6 depicts a controller 611 that provides selection signals for the multiplexer 601, on and off switch control signals for the filter 605, and the signal to control the start of the analog to digital conversion of the ADC 607. The multiplexer selection signals SEL(0:M−1) configure the multiplexer 601 to route one of the input analog signals to the output of the multiplexer coupled to the buffer 603 input. At approximately the same time as the multiplexer selection is changing the controller 601 signals, the controller provides signals SW$\phi$1 and SW$\phi$2 to the switches 602, 608, and 613 to turn on the switches using the control signals. Then after a pre-defined number of time constants $\tau H$ the controller controls switch 602 to turn it off. Subsequently, after a pre-defined number of time constants (typically 1) $\tau L$ elapses, the controller 611 signals switches 608 and 613 of 600 to turn off, thereby ending the sampling period. The sample and hold capacitor Cs-h 615, now isolated from the selected input analog signal, stores the approximate instantaneous voltage of the selected input analog signal at the time switches 608 and 613 of 600 were turned off. The controller 611 then initiates the ADC analog to digital conversion using control signal CONV.

It should be noted that the depiction of the integrated circuit 600 of FIG. 6 is simplified to facilitate the explanation of its operation and additional components and functions can be included in a practical integrated circuit. Further, alternative arrangements for the integrated circuit 600 include forming circuit 600 as part of a highly integrated system on a chip (SoC or SOIC); or in an additional alternative arrangement, the controller 611 can be a stand-alone chip such as microcontroller, microprocessor, digital signal processor, CPU and the like. Off the shelf or existing programmable devices can be used. The integrated circuit 611 can be a custom device or can be formed using a user configurable array logic device such as an FPGA, or CPLD, or the like. In further alternative approaches, the digital portions of the integrated circuit 600 can be formed on digital integrated circuits, and the analog portions can be formed on analog integrated circuits or using discrete components, and the like. Each of these alternative circuit arrangements are contemplated by the inventors as forming additional aspects of the present application and fall within the scope of the appended claims.

Controller 611 can be implemented as an application specific integrated circuit (ASIC), using field programmable gate arrays (FPGAs) or complex programmable logic devices (CPLDs) and the like. The sequencing and timing control of the novel arrangements can be implemented as software, firmware or hardcoded instructions. Delay lines and counters and the like can be used to determine the needed delays including multiples of τH and τL determined by a particular hardware designer.

In FIG. 6, the switches can be implemented on an integrated circuit as a transistor. Examples include field effect transistors such as FETs, metal oxide semiconductor (MOSFETs), complementary MOSFETs, (CMOS), but also other controllable elements such as bipolar and junction transistors can be used to form the switches.

Figure 7:
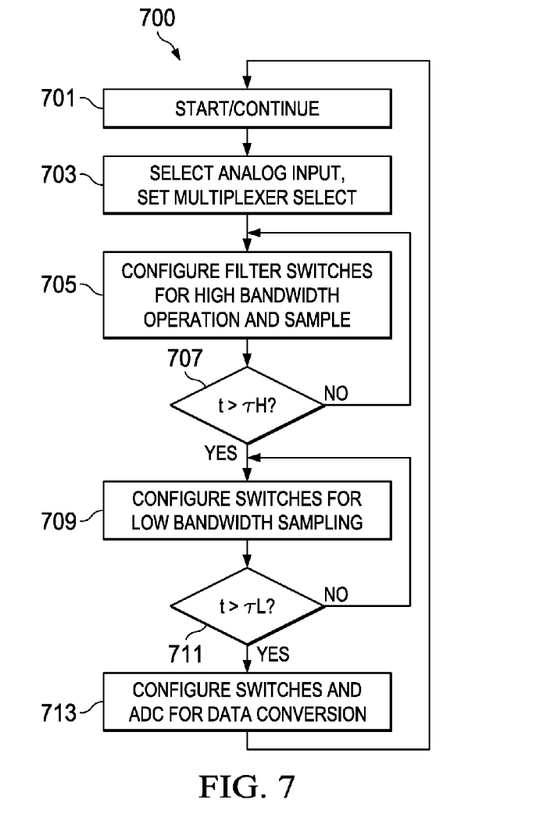
FIG. 7 depicts in a flow diagram a method arrangement of the present application.

FIG. 7 depicts in a flow diagram a method arrangement of the present application. In FIG. 7, method 700 begins at the start block, 701. This start block is also used as a continue block when the method is used in a repeating fashion. For example, if a plurality of analog input signals are present in a multi-modal system, the method 700 is performed for each of the plurality of analog input signals. In addition the method can be repeated to update the digital data over time, for each of the input signals, or alternatively for selected input signals. At step 703, the multiplexer is configured to select one of the analog input signals. At step 705, the filter switches are configured for high bandwidth operation. In an example approach, a resistor in an RC filter that includes a sampling capacitor has a short circuit placed across it so that the sampling is first done without the resistor in the path, as is described above.

At step 707, a decision block tests whether the sampling time t that has elapsed is greater than the high bandwidth sample time (a predetermined number of multiple time constants τH). If the test is true, then the method proceeds to step 713, if not, then the method returns to steps 705 and 707 until the time has elapsed for the high bandwidth operation.

At step 709, the method proceeds to the low bandwidth portion of the sampling operation as described above. In an example with a resistor that can be short-circuited, as described above, the switches are now configured so that the resistor is no longer short circuited but is now in series with the sampling capacitor to form an RC filter network. The method then proceeds to step 711 where a decision block tests whether the sampling time exceeds the low bandwidth portion of the sampling operation, τL, as described above. If the result of the test is true, then the method proceeds to the step 713, otherwise the method returns to the blocks 709 and 711 until the time has exceeded τL.

At step 713 the sampling operation is complete and the system is configured to convert the sampled analog signal stored on the sample and hold capacitor to a digital representation of the voltage. After step 713 is complete, the method returns to the start/continue block 701 and can be performed again for another analog input signal, or a new sample of the present analog signal can be performed.

Although the example arrangements that form aspects of the present application have been described in detail, it should be understood that various changes, substitutions and alterations can be made herein without departing from the spirit and scope of the application as defined by the appended claims.

Moreover, the scope of the present application is not intended to be limited to the particular example arrangements of the process, machine, manufacture, and composition of matter, means, methods and steps described in this specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding arrangements described herein may be utilized according to the arrangements and alternative arrangements. Accordingly, the appended claims are intended to include within their scope such processes, machines, manufacture, compositions of matter, means, methods, or steps.

What is claimed is:

1. An apparatus, comprising:
a circuit input configured to receive a plurality of analog input signals;
an analog to digital converter circuit configured to output a digital representation of an analog voltage;
a selection circuit configured to select one of the analog input signals received at the circuit input;
a buffer coupled to receive the selected one of the analog input signals;
a filter coupled to the buffer having a filter output coupled to a sampling capacitor and including a resistor that is selectively series coupled to the sampling capacitor during a sampling period, responsive to a control signal, and configured to perform a first sample operation having a first time constant corresponding to the sampling capacitor and a second sample operation having a second time constant greater than the first time constant corresponding to the series coupled resistor and the sampling capacitor; and
the sampling capacitor having an output coupled to the analog to digital converter.

2. The apparatus of claim 1, wherein the filter further comprises:
a short circuit path selectively coupled across the resistor during the first sample operation, responsive to control signals.

3. The apparatus of claim 2, wherein the filter further comprises a first switch coupled to enable the short circuit path across the resistor, and a second switch coupled to enable the resistor to couple in series with the sampling capacitor.

4. The apparatus of claim 3, and further comprising a controller circuit coupled to control the selection circuit, the analog to digital converter, and to control the first switch and the second switch, configured to operate the filter in the first sample operation mode and in the second sample operation mode during a sampling of an analog input signal onto the sampling capacitor.

5. The apparatus of claim 1, wherein the analog input signals include a biometric sensor signal.

6. The apparatus of claim 1, wherein the analog input signals have different signal bandwidth.

7. The apparatus of claim 1, wherein at least one of the analog input signals corresponds to a sensor configured for determining a human pulse rate.

8. The apparatus of claim 1, wherein the analog to digital converter is implemented using a successive approximation registered analog to digital converter.

9. A method, comprising:
selecting an analog signal from a plurality of analog signals for conversion in an analog to digital converter;

configuring a filter for a first sampling operation having a first time constant corresponding to a sampling capacitor;

sampling the analog signal onto the sampling capacitor using the filter in the first sampling operation for a first sampling time in a sampling period;

configuring the filter for a second sampling operation having a second time constant greater than the first time constant, the second time constant corresponding to a resistor series coupled to the sampling capacitor;

sampling the analog signal onto the sampling capacitor using the filter in the second sampling operation for a second sampling time in the sampling period;

isolating the sampling capacitor from the analog signal; and using the analog to digital converter, converting the analog signal sampled by the capacitor in the sampling period to a digital representation.

10. The method of claim 9, and further comprising:

during the second sampling operation of the filter, providing the resistor coupled between the analog signal and the sampling capacitor; and during the first sampling operation of the filter, providing a short circuit path across the resistor while coupling the sampling capacitor to the filter.

11. The method of claim 9, wherein the first sampling time continues for a time period exceeding a predetermined multiple of the first time constant.

12. The method of claim 9, wherein the second sampling time continues for a time period exceeding a predetermined multiple of the second time constant.

13. The method of claim 9, and further comprising coupling a buffer between the analog signal and the filter.

14. The method of claim 9, wherein at least one of the analog signals is from a biometric sensor.

15. An integrated circuit, comprising:

an analog to digital converter having an output for transmitting a digital representation of an analog signal;

a sampling capacitor selectively coupled to an analog input signal, and having an output coupled to the analog to digital converter; and a filter selectively coupled between the analog input signal and the sampling capacitor having a first sampling operation and a second sampling operation, responsive to a control signal, the filter further including a resistor selectively coupled in series between the analog input signal and the sampling capacitor in the second sampling operation, and a short circuit path selectively coupled across the resistor in the first sampling operation.

16. The integrated circuit of claim 15, and further comprising:

a multiplexer coupled to receive a plurality of analog input signals and outputting the analog input signal to the filter, responsive to a select control signal.

17. The integrated circuit of claim 15 and further comprising a controller outputting control signals to the filter to select the first sampling operation and the second sampling operation.

* * * * *